United States Patent
Jankowski

(10) Patent No.: US 6,349,913 B1
(45) Date of Patent: Feb. 26, 2002

(54) CUP HOLDER HAVING A VERTICALLY ORIENTED DRAWER

(75) Inventor: Ireneusz Jankowski, Richmond Hill (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/684,709

(22) Filed: Oct. 6, 2000

(51) Int. Cl.$^7$ .............................. A47K 1/08; B60R 7/00
(52) U.S. Cl. ................... 248/311.2; 296/37.12; 296/37.8; 297/194; 224/281
(58) Field of Search .................... 248/311.2, 27.1, 248/314, 286.1, 284.1, 292.14, 298.1; 224/483, 926, 281, 282; 296/37.12, 37.8; 297/194

(56) References Cited

U.S. PATENT DOCUMENTS

| | | | |
|---|---|---|---|
| 4,733,908 A | 3/1988 | Dykstra et al. | 297/194 |
| 4,756,572 A | 7/1988 | Dykstra et al. | 297/194 |
| 4,907,775 A | 3/1990 | Lorence et al. | 248/311.2 |
| 4,955,571 A * | 9/1990 | Lorence et al. | 248/311.2 |
| 4,981,277 A * | 1/1991 | Elwell | 248/311.2 |
| 5,018,633 A * | 5/1991 | Toth et al. | 248/311.2 |
| 5,171,061 A | 12/1992 | Marcusen | 297/194 |
| 5,195,711 A | 3/1993 | Miller et al. | 248/311.2 |
| 5,228,611 A | 7/1993 | Yabuya | 224/281 |
| 5,284,314 A * | 2/1994 | Misaras et al. | 248/311.2 |
| 5,297,767 A | 3/1994 | Miller et al. | 248/311.2 |
| 5,489,054 A * | 2/1996 | Schiff | 224/281 |
| 5,524,958 A * | 6/1996 | Wieczorek et al. | 297/188.17 |
| 5,588,697 A | 12/1996 | Yoshida et al. | 297/173 |
| 5,598,999 A | 2/1997 | Plocher et al. | 248/311.2 |
| 5,618,018 A | 4/1997 | Baniak | 248/311.2 |
| 5,628,486 A * | 5/1997 | Rossman et al. | 248/311.2 |
| 5,634,621 A | 6/1997 | Jankovic | 248/311.2 |
| 5,671,877 A | 9/1997 | Yabuya | 224/282 |
| 5,673,891 A | 10/1997 | Fujihara et al. | 248/311.2 |
| 5,692,658 A | 12/1997 | Fischer et al. | 224/281 |
| 5,749,554 A * | 5/1998 | Avila et al. | 248/311.2 |
| 5,762,307 A | 6/1998 | Patmore | 248/311.2 |
| 5,791,616 A | 8/1998 | Volkmann et al. | 248/311.2 |
| 5,845,888 A * | 12/1998 | Anderson | 248/311.2 |
| 6,010,047 A * | 1/2000 | Osborn | 224/281 |
| 6,024,395 A * | 2/2000 | Kang | 296/37.8 |

* cited by examiner

Primary Examiner—Anita King
(74) Attorney, Agent, or Firm—Myers Bigel Sibley & Sajovec

(57) ABSTRACT

A cup holder has an elongated drawer movable between a retracted position and an extended position. The retracted position is within the housing. The extended position is outside the housing. The drawer has a support platform which is pivotally secured to the drawer. The support platform pivots between a non-supporting position when the drawer is in the retracted position and a supporting position when the drawer is in the extended position. A stabilizing arm is also secured to the drawer and pivots between a non-stabilizing position when the drawer is in the retracted position and a stabilizing position when the drawer is in the extended position. Secured to the support platforms and the stabilizing arms are rods which have support and stabilizing pins extending out therefrom. The rods travel in slots cut out of vertical side walls of the housing. Because the slots have ramp angles, the support platforms and the stabilizing arms pivot between the use and non-use positions as the drawer is moved between its retracted position and its extended position. The stabilizing arm includes an aperture through which the support platform pivots allowing the compact design of the drawer assembly while having a support platform in the stabilizing arm aligned on top of each other so that a cup may be supported by the support platform and stabilized by the stabilizing arm when they are in the use positions.

16 Claims, 3 Drawing Sheets

CUP HOLDER HAVING A VERTICALLY ORIENTED DRAWER

BACKGROUND OF THE INVENTION

1. Field of the Invention

The invention relates to a beverage container holder. More specifically, the invention relates to cup holders which are designed for confined spaces for use in a passenger compartment of the motor vehicle.

2. Description of the Related Art

Beverage container holders, commonly referred to as cup holders, are well-known in the motor vehicle arts. Many different types of such cup holders exist which can be mounted in various locations within the passenger compartment of the motor vehicle. These cup holders are typically movable between a stored or retracted position within a housing and an extended or use position removed from the housing.

U.S. Pat. No. 5,618,018, issued to the Baniak on Apr. 8, 1997, discloses a cup holder which is storable in a confined space. The cup holder has a support member that acts as a drawer which pivots between a retracted position within its housing and an extended position outside of its housing. A container holder or stabilizing arm rotates about its axis when it is released from the housing and pivots perpendicularly to the support member so that a cup may be held therein. Because the container holder rotates about its axis directly above the support member, this cup holder can only hold one cup or container at a time. This design is less desirable when multiple cups are needed to be stored.

U.S. Pat. No. 5,762,307, issued to Patmore on Jun. 9, 1998, discloses a cup holder capable of holding two cups side by side at a single time. The cup holder includes a housing from which the cup holder pivots. The cup holder has a support structure and a stabilizing structure. The support structure and stabilizing structure pivot through the same space to reach the use or extended position. This design is rugged and capable of holding more than one cup at a time. This design fails, however, to provide a cup holder which may be stored in a compact manner where access to the cup holder and storage space of the cup holder are limited. More specifically, the cup holder has a center structure from which the stabilizing arms and supports depend and extend therefrom. The center structure requires a great deal of space to operate. This prevents the cup holder from being secured and stored in places having little space to provide an opening for the release of the cup holder into its extended or use position. Further, the space required to allow this cup holder to pivot from its retracted position to its extended position is great. Therefore, there is a need in the art for a cup holder capable of holding more than one cup at a time while having a small footprint allowing it to be stored in and accessed from a small location.

SUMMARY OF THE INVENTION

A container holding assembly is disclosed including a housing defining an elongated vertical axis opening. A drawer is movable between a retracted position within the housing and an extended position outside of the housing. The container holding assembly also includes a support platform pivotally secured to the drawer. The support platform pivots between a non-supporting position when the drawer is in the retracted position and a supporting position when the drawer is in the extended position. The container holding assembly also includes a stabilizing arm pivotally secured to the drawer. The stabilizing arm includes an inner surface defining an aperture. The stabilizing arm is pivotal between a non-stabilizing position when the drawer is in the retracted position and a stabilizing position when the drawer is in the extended position. The support platform and stabilizing arm are designed such that the support platform travels through a portion of the aperture when the support platform pivots to and from the supporting position.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
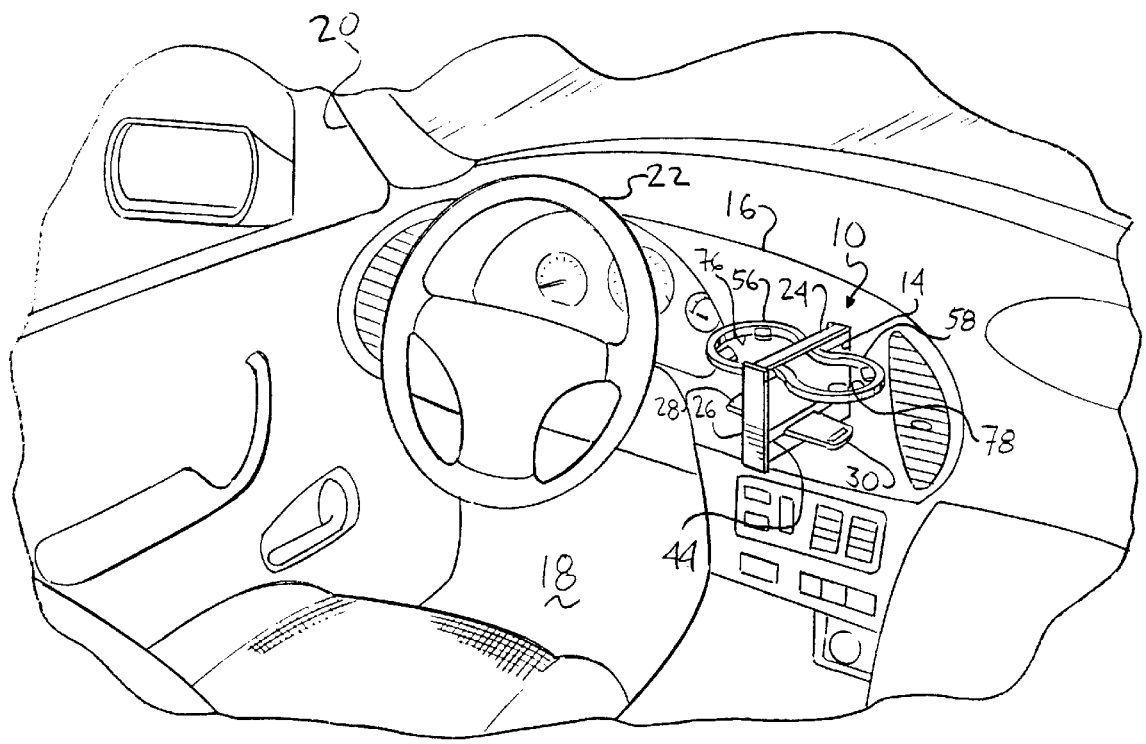
FIG. 1 is a perspective view of one embodiment of the invention, in an extended position, located in a passenger compartment, partially cut away, of a motor vehicle.
Figure 2:
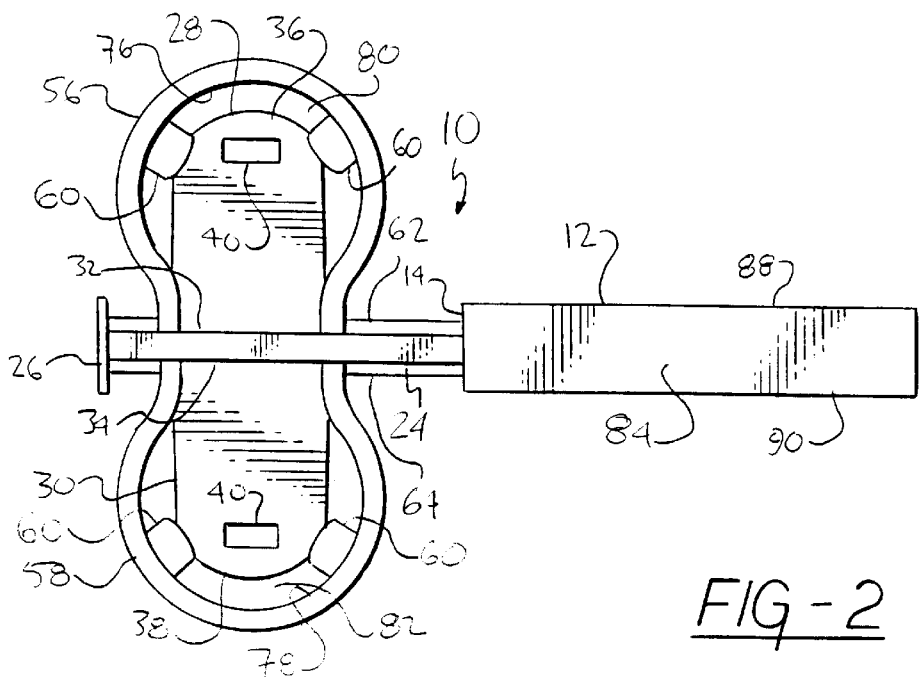
FIG. 2 is a top view of one embodiment of the invention in the extended position.
Figure 3:
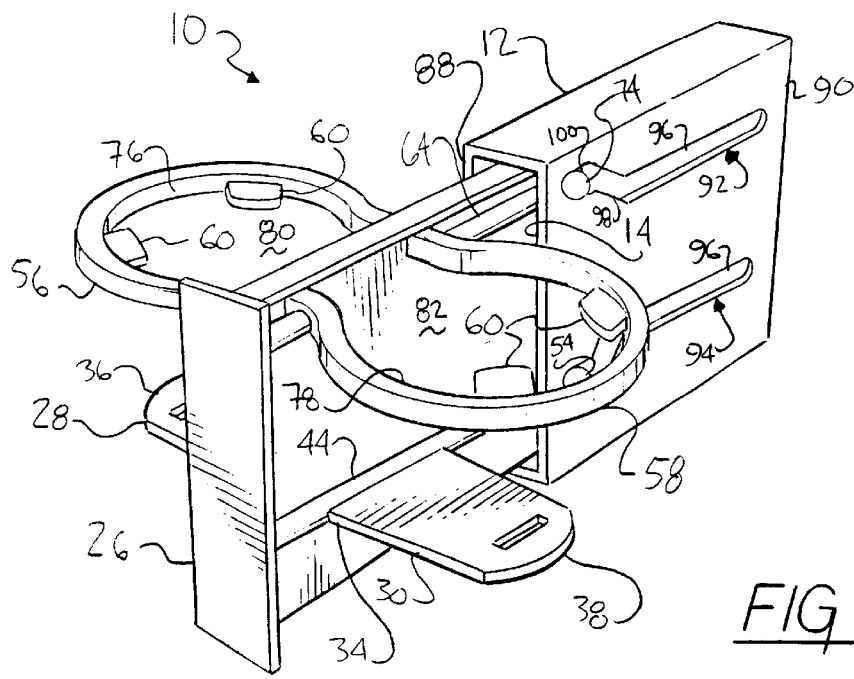
FIG. 3 is a perspective view of one embodiment of the invention in the extended position.

Referring to the Figures, one embodiment of the invention is generally indicated at 10. The invention is a container or cup holder 10. The cup holder 10 includes a housing 12. The housing 12 is rectangular in shape. The housing 12 also includes an opening 14. The housing 12 is securable to a structure 16 found inside a passenger compartment 18 of a motor vehicle 20 in any suitable manner. In the embodiment shown in FIG. 1, the structure 16 is an instrument panel. It may be appreciated by those skilled in the art that the structure 16 may be any surface found in the passenger compartment 18 suitable for having a cup holder 10 stored therein.

There are structures 16 within the passenger compartment 18 which are desirable for securing a cup holder 10. Some of these locations are, however, compact and provide limited space for storage. The location of the cup holder 10 in the instrument panel 16 as shown in FIG. 1 is one of these locations. Further, these locations may include other objects, i.e., a steering wheel 22, which may prevent the cup holder 10 from opening by obstructing or occupying the space immediately adjacent the structure 16.

The opening 14 of the housing 12 is an elongated vertical axis opening 14. The opening 14, similar to the housing 12, allows the cup holder 10 to be placed in a location with limited access available.

Figure 7:
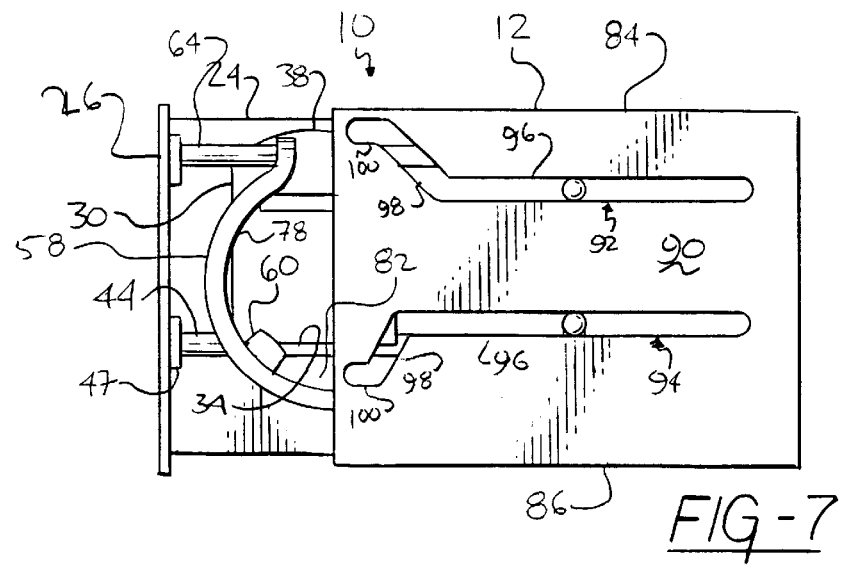
FIG. 7 is a side view of one embodiment of the invention as the drawer has moved substantially toward the retracted position.

The cup holder 10 includes a drawer 24. The drawer 24 has a front face 26 which closes the vertical axis opening 14 to the housing when the drawer 24 is in its retracted or closed position. The front face 26 is decorative and may take any shape or contour. The drawer 24 is movable between a retracted position within the housing 12 and an extended position outside of the housing 12. The drawer 24 is in the extended position in FIGS. 1 through 6. In the extended position, the cup holder 10 may hold two containers or cups (not shown). In the retracted position, the drawer 24 is completely within the housing 12 and stored in a non-obstructive manner for future use. FIG. 7 shows the drawer 24 approaching the retracted position.

At least one support platform 28 is pivotally secured to the drawer 24. In the embodiment shown, there are two support platforms 28, 30. The support platforms 28, 30 extend between a base end 32, 34 and the distal end 36, 38, respectively. The support platforms 28, 30 support the cups when they are being held by the cup holder 10. Each of the support platforms 28, 30 includes a cut out 40 disclosed adjacent the distal ends 36, 38 thereof. The support platforms 28, 30 pivot about the base ends 32, 34 between a non-supporting position and a supporting position. The base ends 32, 34 are each connected to a rod 42, 44. The rods 42, 44 extend between the front face 26 and through a back plate 46 of the drawer 24. Receptacles 47 (one shown in FIGS. 5 through 7) are fixedly secured to the front face 26 to hold the front ends of the rods 42, 44 thereto.

Each of the rods 42, 44 include a support pin 48, 50. The support pins 48, 50 extend out perpendicularly to the longitudinal axis defined by the rods 42, 44. The orientation of the support pins 48, 50 is forty five degrees (45°) below that of the support platforms 28, 30 to which their respective rods 42, 44 are attached. More specifically, with regard to the support platform 28, the support pin 48 extends out forty five degrees (45°) clockwise with respect to the support platform 28 and the support pin 50 extends out forty five degrees (45°) counterclockwise with respect to the support platform 30 as viewed from FIG. 4. Each of the support pins 48, 50 include a rounded end 52, 54, respectively.

Figure 4:
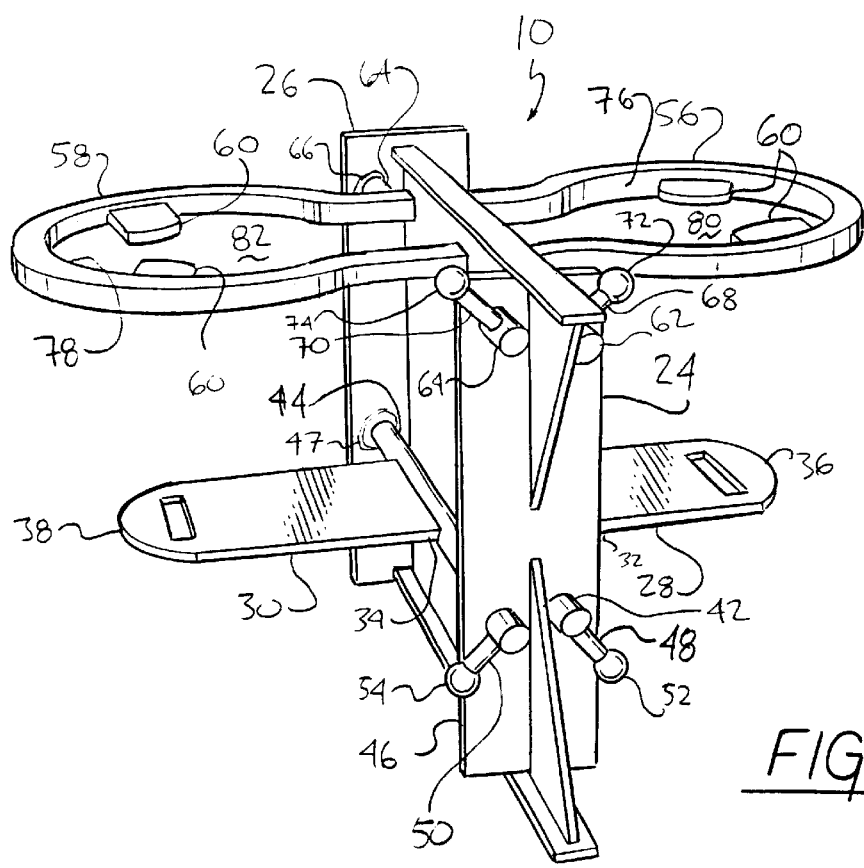
FIG. 4 is a perspective back view of one embodiment of the invention without a housing.
Figure 5:
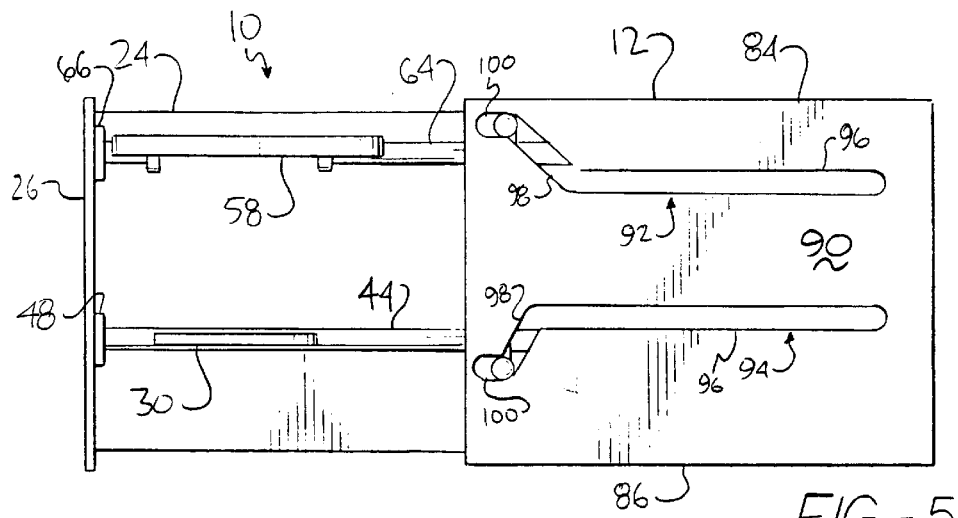
FIG. 5 is a side view of one embodiment of the invention in the extended position.
Figure 6:
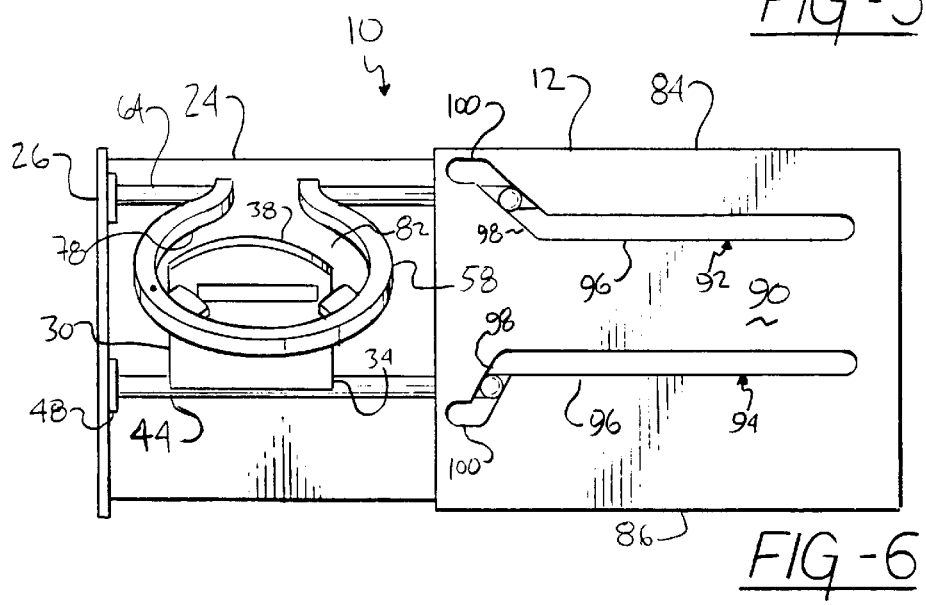
FIG. 6 is a side view of one embodiment of the invention as the drawer is moving from the extended position toward a retracted position.

The cup holder 10 also includes at least one stabilizing arm 56. In the embodiment shown in the Figures, two stabilizing arms 56, 58 are shown. Each of the stabilizing arms 56, 58 include flexible receiving tabs 60 used for receiving a cup therein and preventing the cup from moving and vibrating too much due to the size of the cup and vibrations found in the passenger compartment 18 of the motor vehicle 20, respectively. The stabilizing arms 56, 58 hold the cup being supported by the support platforms 28, 30. The stabilizing arms 56, 58 are secured to rods 62, 64. The rods 62, 64 extend between the front face 26 and through the back plate 46 of the drawer 24. Receptacles 66 (one shown in FIGS. 5 through 7) are fixedly secured to the front face 26 to hold the ends of the rods 62, 64 thereto. Each of the rods 62, 64 include a stabilizing pin 68, 70 extending out therefrom perpendicularly to a longitudinal axis defined by the rods 62, 64. The stabilizing pins 68, 70 are offset from the stabilizing arms 56, 58 by forty five degrees (45°). More specifically, the stabilizing pin 68 is forty five degrees (45°) counterclockwise with respect to the stabilizing arm 56 and the stabilizing pin 70 is forty five degrees (45°) clockwise with respect to the stabilizing arm 58 when viewed in FIG. 4. Because the support platforms 28, 30 and the stabilizing arms 56, 58 rotate to their respective support positions and stabilizing positions in opposite directions, the support pins 48, 50 and the stabilizing pins 68, 70 are offset from each other by ninety degrees (90°) for each of their respective sides. This is best shown in FIG. 4. Like the support pins 48, 50, the stabilizing pins 68, 70 each include a rounded end 72, 74.

Each of the stabilizing arms 56, 58 define an inner surface 76, 78. The inner surfaces 76, 78 define an aperture 80, 82.

The stabilizing arms 56, 58 are movable between a non-stabilizing position (FIG. 7) when the drawer 24 is in the retracted position and a stabilizing position (FIG. 5) when the drawer 24 is in the extended position. (The support positions and non-support positions for the support platforms 28, 30 and the stabilizing positions and the non-stabilizing positions for the stabilizing arms may collectively be referred to as the "use positions" and "non-use positions," respectively.) As can be seen when viewing FIGS. 5 through 7, a portion of the support platforms 28, 30 travel through a portion of the apertures 80, 82, respectively, when the support platforms 28, 30 pivot to and from the supporting position, shown in FIG. 5. Therefore, when the drawer 24 is moved from its retracted position to its extended position, the support platforms 28, 30 pivot downwardly from the non-supporting position to the supporting positions and the stabilizing arms 56, 58 pivot upwardly from the non-stabilizing positions to the stabilizing positions at the same time. Because the stabilizing arms 56, 58 are aligned directly over the support platforms 28, 30, the support platforms 28, 30 must pivot through a portion of the apertures 80, 82 of the stabilizing arms 56, 58 to prevent the support platforms 28, 30 and the stabilizing arms 56, 58 from interfering or colliding due to their respective pivoting motions. By having the support platforms 28, 30 extend through a portion of the apertures 80, 82, the longitudinal length of the drawer 24 can be reduced, further allowing the cup holder 10 to be located in confined spaces.

The housing 12 includes a top surface 84, a bottom surface 86 and at least two vertical side walls 88, 90. Each of the vertical side walls 88, 90 includes two slots, generally shown at 92, 94 (only one set of slots 92, 94 are shown). Each of the slots 92, 94 receive a rounded end 54, 74 from the support pin 48 and stabilizing pin 68. The two slots 92, 94 mirror each other when viewed from an axis extending therebetween.

The slots 92, 94 include a plurality of stages 96, 98, 100. Each of the plurality of stages 96, 98, 100 create a ramp angle with another of the plurality of stages 96, 98, 100 adjoining therewith. More specifically, the middle stage 98 creates a ramp angle with each of the pair of end stages 96, 100. The rounded ends 52, 54, 72, 74 of the support pins 48, 50 and the stabilizing pins 68, 70 provide smooth movement through the slots 92, 94 which, in turn, allows the support platforms 28, 30 and the stabilizing arms 56, 58 to smoothly move between the non-use positions and the use positions. The middle stage 98 is long enough such that the support pins 48, 50 and the stabilizing pins 68, 70 rotate through ninety degrees (90°). This allows the support platforms 28, 30 and stabilizing arms 56, 58 to rotate through ninety degrees (90°) between their respective use positions and non-use positions.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A cup holding assembly comprising:

a housing defining an elongated vertical axis opening;

a drawer movable between a retracted position within said housing and an extended position outside of said housing;

a support platform pivotally secured to said drawer, said support platform pivotal between a non-supporting position when said drawer is in said retracted position and a supporting position when said drawer is in said extended position; and a stabilizing arm pivotally secured to said drawer including an inner surface defining an aperture, said stabilizing arm pivotal between a non-stabilizing position when said drawer is in said retracted position and a stabilizing position when said drawer is in said extended position such that said support platform travels through a portion of said aperture when said support platform pivots to and from said supporting position.

2. A cup holding assembly as set forth in claim 1 wherein said housing includes a vertical side wall defining two slots.

3. A cup holding assembly as set forth in claim 2 wherein said support platform includes a support pin to travel in one of said two slots.

4. A cup holding assembly as set forth in claim 3 wherein said stabilizing arm includes a stabilizing pin to travel in another of said two slots.

5. A cup holding assembly as set forth in claim 4 wherein each of said two slots includes a plurality of stages wherein each of said plurality of stages adjoins another of said plurality of stages.

6. A cup holding assembly as set forth in claim 5 wherein each of said plurality of stages creates a ramp angle with another of said plurality of stages adjoining therewith.

7. A cup holding assembly as set forth in claim 6 wherein said two slots define a longitudinal axis therebetween.

8. A cup holding assembly as set forth in claim 7 wherein said two slots mirror each other along said longitudinal axis.

9. A cup holding assembly comprising:

a housing defining an elongated vertical axis opening and including two vertical side walls;

a drawer movable between a retracted position within said housing and an extended position outside of said housing, said drawer including two drawer side walls facing each of said two vertical side walls of said housing;

a support platform pivotally secured to each of said drawer side walls, each of said support platforms defining a support periphery, each of said platforms pivotal between a non-supporting position when said drawer is in said retracted position and a supporting position when said drawer is in said extended position;

a stabilizing arm pivotally secured to each of said drawer side walls, each of said stabilizing arms, including an inner surface defining an aperture, being pivotal between a non-stabilizing position when said drawer is in said retracted position and a stabilizing position when said drawer is in said extended position such that said support platform travels through a portion of said aperture when said support platform pivots to and from said support position.

10. A cup holding assembly as set forth in claim 9 wherein each of said vertical side walls defines two slots.

11. A cup holding assembly as set forth in claim 10 wherein each of said support platforms includes a support pin to travel in one of said two slots.

12. A cup holding assembly as set forth in claim 11 wherein each of said stabilizing arms includes a stabilizing pin to travel in another of said two slots.

13. A cup holding assembly as set forth in claim 12 wherein each of said two slots for each of said two vertical side walls includes a plurality of stages wherein each of said plurality of stages adjoins another of said plurality of stages.

14. A cup holding assembly as set forth in claim 13 wherein each of said plurality of stages creates a ramp angle with another of said plurality of stages adjoining therewith.

15. A cup holding assembly as set forth in claim 14 wherein each of said two slots on each of said vertical side walls defines a longitudinal axis therebetween.

16. A cup holding assembly as set forth in claim 15 wherein said two slots on each of said vertical side walls mirror each other along said longitudinal axis.

\* \* \* \* \*